(12) United States Patent
Shaw et al.

(10) Patent No.: US 12,372,447 B2
(45) Date of Patent: Jul. 29, 2025

(54) ALTERNATING PRESSURE FATIGUE TEST SYSTEM FOR HIGH-SPEED TRAIN BASED ON INTERNAL ROOT PUMP LOADING MECHANISM

(71) Applicants: Raymond Zhou Shaw, Shanghai (CN); Bin Wu, Shanghai (TW); Jason Tang, Shanghai (CN)

(72) Inventors: Raymond Zhou Shaw, Shanghai (CN); Bin Wu, Shanghai (TW); Jason Tang, Shanghai (CN)

(73) Assignees: ELIVAC CO., LTD., Shanghai (CN); Shaw Raymond Zhou, Shanghai (CN); ELIVAC INC

( * ) Notice: Subject to any disclaimer, the term of this patent is extended or adjusted under 35 U.S.C. 154(b) by 297 days.

(21) Appl. No.: 18/208,903

(22) Filed: Jun. 13, 2023

(65) Prior Publication Data

US 2024/0418617 A1      Dec. 19, 2024

(51) Int. Cl.
*G01M 17/08*      (2006.01)
*B61L 27/60*      (2022.01)
*G01N 3/36*       (2006.01)

(52) U.S. Cl.
CPC ............... *G01N 3/36* (2013.01); *B61L 27/60* (2022.01); *G01M 17/08* (2013.01)

(58) Field of Classification Search
CPC ........... G01N 3/36; B61L 27/60; G01M 17/08
See application file for complete search history.

(56) References Cited

U.S. PATENT DOCUMENTS

| 5,446,389 A | * | 8/1995 | Lenz | G01R 31/008 |
| | | | | 73/114.61 |
| 2017/0369085 A1 | * | 12/2017 | Sleasman | B61L 27/60 |
| 2021/0179054 A1 | * | 6/2021 | Wright | B60T 17/228 |

* cited by examiner

*Primary Examiner* — Eric S. McCall

(57) ABSTRACT

An alternating pressure fatigue test system for a high-speed train based on an internal root pump loading mechanism includes a train body; a first tube having one end forming a gas output opening and a second tube having one end forming a gas input opening; another end of the first tube and another end of the second tube being connected to each other to form a third joint; a connective tube connected to a first joint on the first tube and a second joint on the second tube and being installed with at least one root pump; a first isolation valve and a third isolation valve installed in the first tube; a second isolation valve and a fourth isolation valve installed in the second tube; and at least one transferring tube connected between the third joint and the train body.

12 Claims, 3 Drawing Sheets

ALTERNATING PRESSURE FATIGUE TEST SYSTEM FOR HIGH-SPEED TRAIN BASED ON INTERNAL ROOT PUMP LOADING MECHANISM

FIELD OF THE INVENTION

The present invention relates to an alternating pressure fatigue test system, and in particular to an alternating pressure fatigue test system for a high-speed train based on an internal root pump loading mechanism.

BACKGROUND OF THE INVENTION

When a train passes through a tunnel at high speed, the air flow space in the tunnel is limited by the tunnel wall and the train wall and the air is compressed to produce a sharp change of air pressure and generate a tunnel pressure wave. The tunnel pressure wave involves two major train safety issues, one is that the tunnel pressure wave is transmitted into the train through the opening of the ventilation tunnel of the train and various gaps in different components of the train, which results in pressure fluctuations in the train and makes passengers' ears uncomfortable. Second, the tunnel pressure wave leads to a pressure difference between the inside and outside of the train, that is, alternating pneumatic (or dynamic air) load of the train, which causes the risk of fatigue fracture of the train.

With the rapid development of high-speed trains, it is necessary to develop alternating pneumatic load test device. First, a pneumatic fatigue load fatigue test is applied to the body and key components of the train to ensure the safety of high-speed trains in service. Second, a train body airtightness test is applied to the new high-speed train to ensure that the pressure changes of the train running at high-speed meet the comfortability requirements of passenger.

In prior arts, main test mechanisms used in the alternating pneumatic load test device include internal root bump loading mechanism, external root bump loading mechanism, stepper motor loading mechanism and eccentric wheel push-in loading mechanism. Disadvantage of internal root bump loading mechanism in prior art is that the train body needs to form a through hole and the test system is not easy to control. Disadvantage of external root bump loading mechanism in prior art is that it is difficult to control the waveform and it requires an additional closed chamber, and the test system is unmovable and has a large volume.

SUMMARY OF THE INVENTION

Accordingly, for improving above mentioned defects in the prior art, the object of the present invention is to provide an alternating pressure fatigue test system for a high-speed train based on an internal root pump loading mechanism, wherein advantages of the present invention are that at least one root pump, a plurality of tubes and valves form a complete test system for alternating pressure fatigue test for a train body of a high-speed train by means of alternating the pressure of the train body between a positive and negative pressure. Soft and hard tubes and pressure sensors are connected to the train body for testing and monitoring of a movable control unit. The present invention is able to be completely unattended and is able to adjust the test pressure range and generate different test waveform curve according to various speed types of high-speed trains. The present invention improves the hardware system and control system in the alternating pressure fatigue test system for a high-speed train. Therefore, the floor space, investment costs and power consumption of the fatigue test system are significantly reduced. The present invention is able to intelligently apply alternating pressure fatigue test to various high-speed trains with running speeds from 200 to 600 km per hour. The present invention is able to simulate the pressure changes inside and outside the high-speed train when the high-speed train is passing through a tunnel or crossing other high-speed train inside the tunnel more realistically so that actual working conditions can be reflected. The present invention ensures that the gas flow field inside the high-speed train is uniform and the pressure waveform is easy to control. The present invention has no temperature rising and is movable and easy to integrate, which has dual functions of fatigue test and pressure-holding test.

To achieve above object, the present invention provides an alternating pressure fatigue test system for a high-speed train based on an internal root pump loading mechanism serving to apply an alternating pressure fatigue test to the high-speed train; the alternating pressure fatigue test system comprising: a train body (1) which is a train body of the high-speed train; a first tube (20) and a second tube (25); the first tube (20) having one end which forms a gas output opening (22); the second tube (25) having one end which forms a gas input opening (27); another end of the first tube (20) and another end of the second tube (25) being connected to each other to form a third joint (C); a connective tube (30) having one end connected to a first joint (A) located at a middle part of the first tube (20) and another end of the connective tube (30) being connected to a second joint (B) located at a middle part of the second tube (25); the first tube (20), the second tube (25) and the connective tube (30) serving to transfer gas; gases within the first tube (20), the second tube (25) and the connective tube (30) being communicated with each other; at least one root pump (2) installed on the connective tube (30) and serving to transfer gas within the connective tube (30) in a single fixed direction; a first isolation valve (42) installed in the first tube (20) and located between the gas output opening (22) and the first joint (A); a second isolation valve (44) installed in the second tube (25) and located between the gas input opening (27) and the second joint (B); a third isolation valve (46) installed in the first tube (20) and located between the first joint (A) and the third joint (C); a fourth isolation valve (48) installed in the second tube (25) and located between the second joint (B) and the third joint (C); and wherein gas flow and direction of the gas flow in the first tube (20), the second tube (25) and the connective tube (30) are controlled by opening and closing of the first isolation valve (42), second isolation valve (44), third isolation valve (46) and fourth isolation valve (48) to switch the a pressure within the train body (1) between a positive pressure and a negative pressure; at least one transferring tube (35) connected between the third joint (C) and the train body (1); gases within the first tube (20), the second tube (25) and the train body (1) being communicated with each other through the at least one transferring tube (35); wherein when external gas needs to be input into the train body (1) for testing, the second isolation valve (44) and the third isolation valve (46) are opened and the first isolation valve (42) and the fourth isolation valve (48) are closed; by pumping of the at least one root pump (2), external gas is input from the gas input opening (27) to the second joint (B) of the second tube (25) and flows through the connective tube (30) to the first joint (A) of the first tube (20) and flows to the third joint (C) and flows through the at least one transferring tube (35) into the train body (1) for testing; a gas input path is formed between the gas input opening (27) and the third joint (C); wherein when gas within the train body (1) needs to be output for testing, the first isolation valve (42) and the fourth isolation valve (48) are opened and the second isolation valve (44) and the third isolation valve (46) are closed; by pumping of the at least one root pump (2), gas within the train body (1) leaves from the at least one transferring tube (35) to the third joint (C) and flows to the second joint (B) of the second tube (25) and flows through the connective tube (30) to the first joint (A) of the first tube (20) and flows to the gas output opening (22) to be output from the gas output opening (22) for testing; a gas output path is formed between the third joint (C) and the gas output opening (22); and wherein the at least one root pump (2) serves as at least one root vacuum pump when the pressure within the train body (1) is lower than a standard atmosphere (1 atm); the at least one root pump (2) serves as at least one root blower when the pressure within the train body (1) is higher than or equal to the standard atmosphere.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
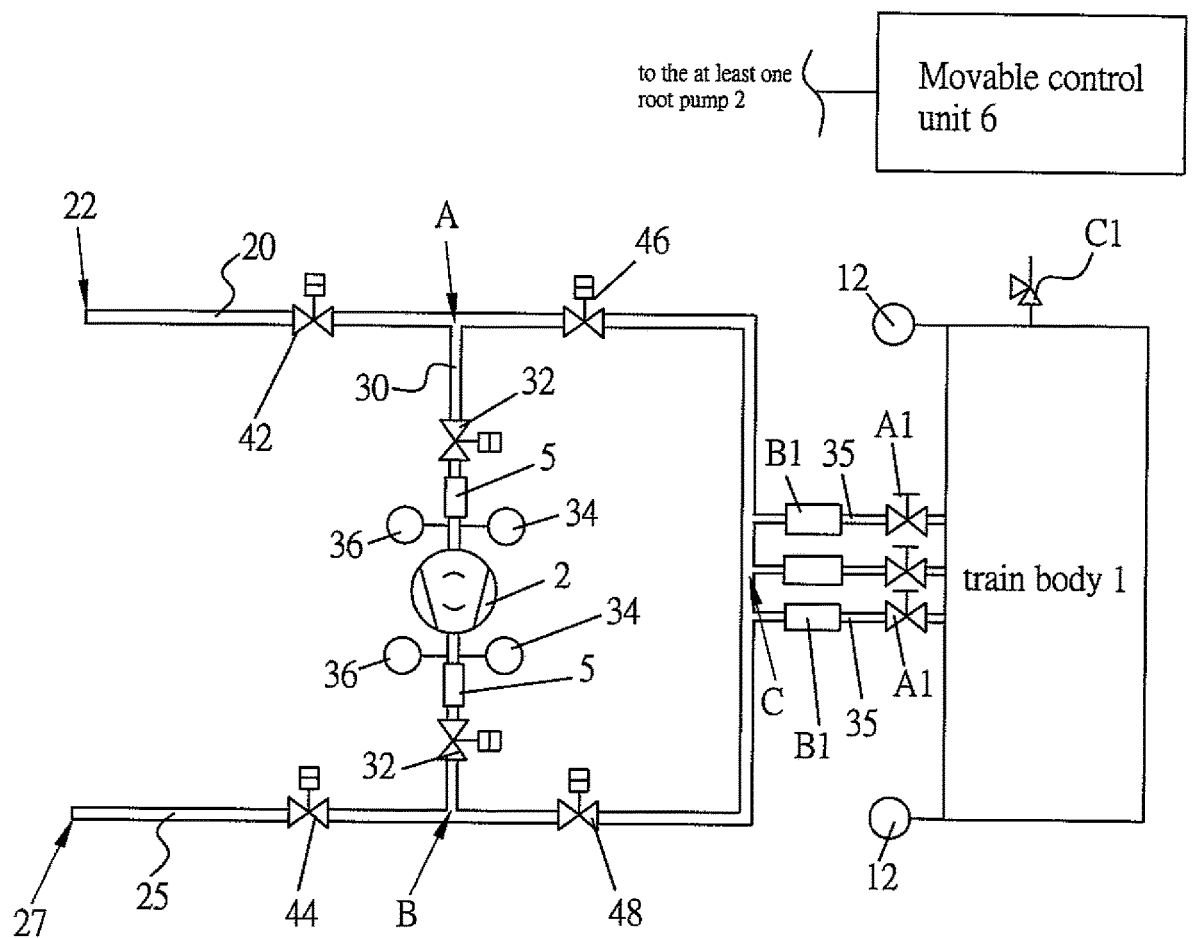
FIG. 1 is an assembled schematic view showing the elements of the present invention.
Figure 2:
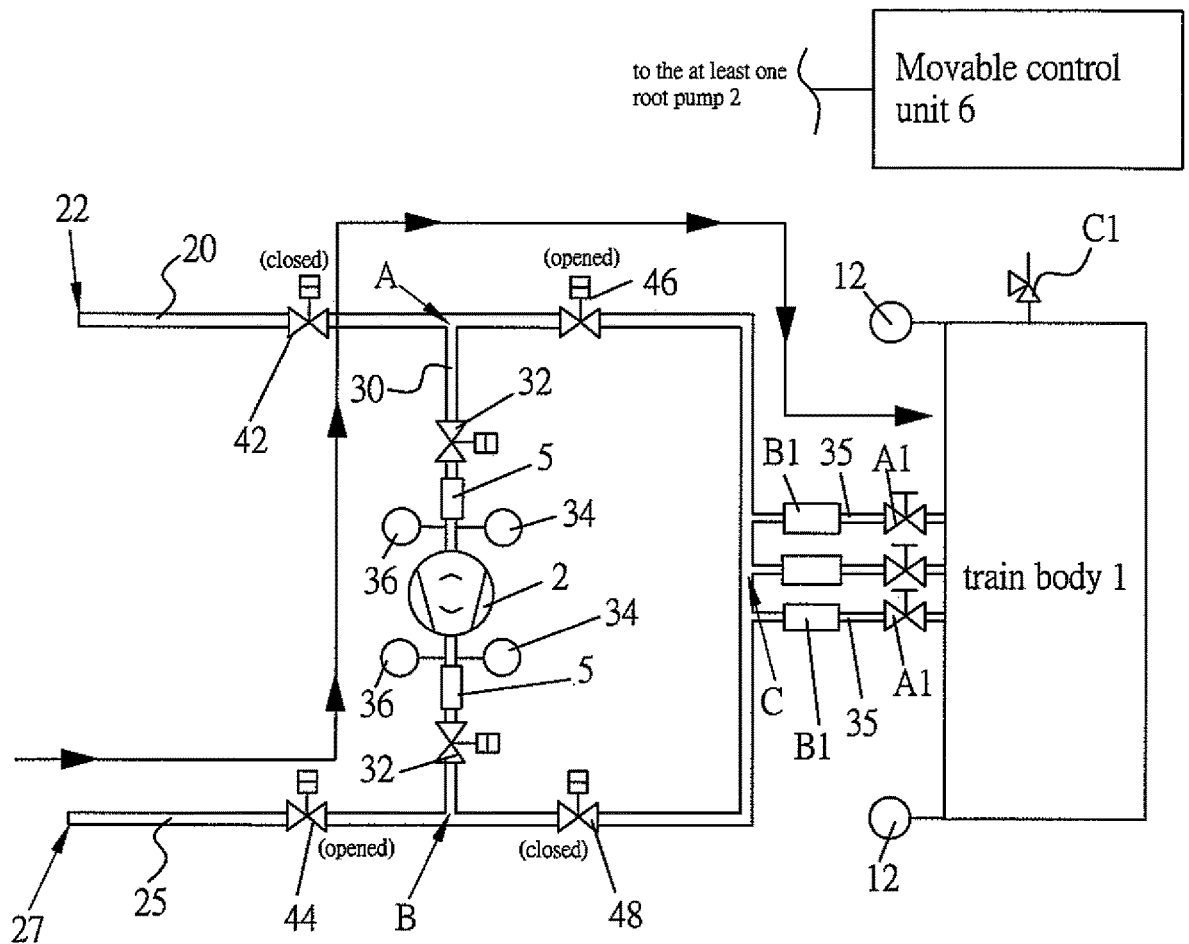
FIG. 2 shows is an application of the present invention, wherein directions of arrows indicate input directions of gas flow.
Figure 3:
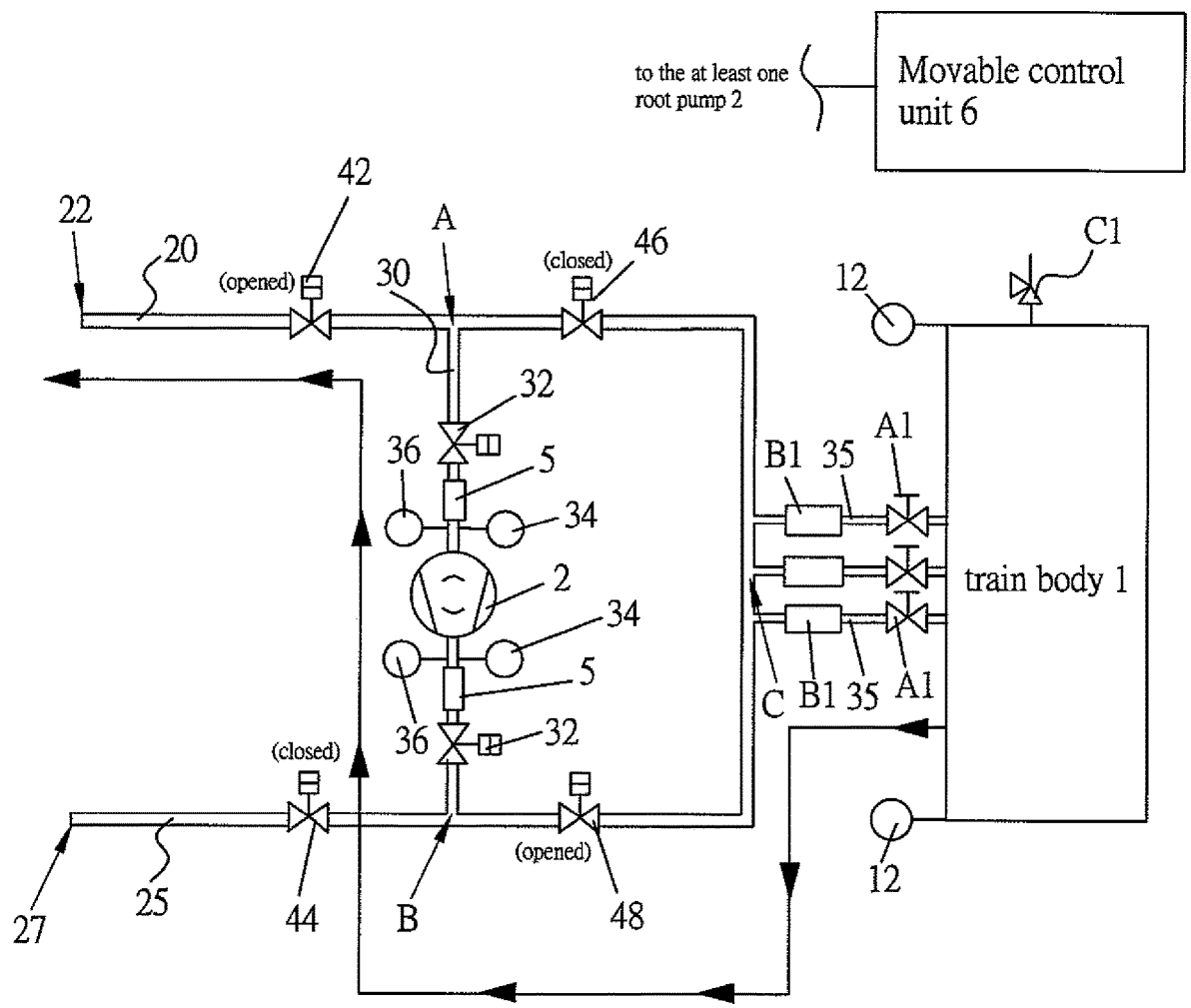
FIG. 3 shows is an application of the present invention, wherein directions of arrows indicate output directions of gas flow.

Referring to FIGS. 1 to 3, the structure of the present invention is illustrated. The present invention serves to apply an alternating pressure fatigue test to a high-speed train which is a train traveling with very high speed, such as high-speed rail (HSR) or underground high-speed railway (subway/metro). Alternating pressure test is an important procedure in manufacturing of the high-speed train. The alternating pressure fatigue test is used to simulate pneumatic (or dynamic air) load fatigue of train windows, train skirts, other train parts and a train body of the high-speed train when the high-speed train is passing through a tunnel. The present invention comprises the following elements.

A train body 1. In the embodiment, the train body 1 is a train body of a high-speed train.

A first tube 20 and a second tube 25. The first tube 20 has one end which forms a gas output opening 22. The second tube 25 has one end which forms a gas input opening 27. Another end of the first tube 20 and another end of the second tube 25 are connected to each other to form a third joint C.

A connective tube 30 has one end connected to a first joint A located at a middle part of the first tube 20 and another end of the connective tube 30 is connected to a second joint B located at a middle part of the second tube 25. The first tube 20, the second tube 25 and the connective tube 30 serves to transfer gas. Gases within the first tube 20, the second tube 25 and the connective tube 30 are communicated with each other.

At least one root pump 2 is installed on the connective tube 30 and serves to transfer gas within the connective tube 30 in a single fixed direction. The at least one root pump 2 serves as at least one root vacuum pump when the pressure within the train body 1 is lower than a standard atmosphere (1 atm) (negative pressure). The at least one root pump 2 serves as at least one root blower when the pressure within the train body 1 is higher than or equal to the standard atmosphere (positive pressure).

The root pump 2 is a pump serving to compress and convey gas by relative motion of two two-leaf-shaped rotors or two three-leaf-shaped rotors in a chamber room of the root pump 2. There is one root pump 2 shown in FIG. 1, however number of the at least one root pump 2 is able to be changed as needed.

A first isolation valve 42 is installed in the first tube 20 and is located between the gas output opening 22 and the first joint A.

A second isolation valve 44 is installed in the second tube 25 and is located between the gas input opening 27 and the second joint B.

A third isolation valve 46 is installed in the first tube 20 and is located between the first joint A and the third joint C.

A fourth isolation valve 48 is installed in the second tube 25 and is located between the second joint B and the third joint C.

The first isolation valve 42, the second isolation valve 44, the third isolation valve 46 and the fourth isolation valve 48 is selected from a butterfly valve and a gate valve. Gas flow and direction of the gas flow in the first tube 20, the second tube 25 and the connective tube 30 are controlled by opening and closing of the first isolation valve 42, second isolation valve 44, third isolation valve 46 and fourth isolation valve 48 to switch the pressure within the train body 1 between a positive pressure and a negative pressure.

At least one transferring tube 35 is connected between the third joint C and the train body 1. Gases within the first tube 20, the second tube 25 and the train body 1 are communicated with each other through the at least one transferring tube 35. FIG. 1 shows that the at least one transferring tube 35 is three transferring tube 35, however number of the at least one transferring tube 35 is able to be changed as needed.

Referring to FIG. 2, in alternating pressure test, when external gas needs to be input into the train body 1 for testing, the second isolation valve 44 and the third isolation valve 46 are opened and the first isolation valve 42 and the fourth isolation valve 48 are closed. By pumping of the at least one root pump 2, external gas is input from the gas input opening 27 to the second joint B of the second tube 25 and flows through the connective tube to the first joint A of the first tube 20 and flows to the third joint C and flows through the at least one transferring tube 35 into the train body 1 for testing. Therefore, a gas input path is formed between the gas input opening 27 and the third joint C. Directions of arrows shown in FIG. 2 indicate input directions of gas flow from the gas input opening 27. When gas flows into the train body 1 through the at least one transferring tube 35, the pressure within the train body 1 is changed to a positive pressure.

Referring to FIG. 3, when gas within the train body 1 needs to be output for testing, the first isolation valve 42 and the fourth isolation valve 48 are opened and the second isolation valve 44 and the third isolation valve 46 are closed.

By pumping of the at least one root pump 2, gas within the train body 1 leaves from the at least one transferring tube 35 to the third joint C and flows to the second joint B of the second tube 25 and flows through the connective tube 30 to the first joint A of the first tube 20 and flows to the gas output opening 22 to be output from the gas output opening 22 for testing. Therefore, a gas output path is formed between the third joint C and the gas output opening 22. Directions of arrows shown in FIG. 3 indicate output directions of gas flow from the train body 1. When gas flows out from the train body 1 through the at least one transferring tube 35, the pressure within the train body 1 is changed to a negative pressure.

Operating of the at least one root pump 2 is controlled by variable frequency controlling. The variable frequency controlling ensures safety and stability of the at least one root pump 2. Power consumption of the at least one root pump 2 is reduced by low frequency controlling. Performance of pumping pressure of the at least one root pump 2 is increased by high frequency controlling. Controlling frequency of the at least one root pump 2 is adjusted according to different types of the least one root pump 2.

Preferably, at least one-proportional control valve 32 is installed in the connective tube 30 and is located near the at least one root pump 2. FIG. 1 shows that there are two proportional control valves 32 are installed in the connective tube 30 near an inlet end and an outlet end of the root pump 2, respectively. The at least one proportional control valve 32 serves to control gas flow rate in the transferring tube 35. The proportional control valve 32 may be any valve capable of controlling opening ratio and gas flow direction, such as a butterfly valve, a gate valve, etc.

Preferably, at least one temperature sensor 34 is installed in the connective tube 30 and is located near the at least one root pump 2. FIG. 1 shows that there are two temperature sensors 34 are installed in the connective tube 30 at the inlet end and the outlet end of the root pump 2, respectively. The at least one temperature sensor 34 serves to monitor gas temperature in the connective tube 30 to ensure correct operation of the present invention.

Preferably, at least one pressure sensor 36 is installed in the connective tube 30 and is located near the at least one root pump 2. FIG. 1 shows that there are two pressure sensors 36 are installed in the connective tube 30 at the inlet end and the outlet end of the root pump 2, respectively. The at least one first pressure sensor 36 serves to monitor pressure load of the at least one root pump 2.

Preferably, at least one silencer 5 is installed on the connective tube 30 and is located near the at least one root pump 2. FIG. 1 shows that there are two silencers 5 are installed on the connective tube 30 at the inlet end and the outlet end of the root pump 2, respectively. The at least one silencer 5 serves to decrease noise of the present invention.

Preferably, the root pump 2 has a vibration sensor (not shown) to monitor vibration of a bearing (not shown) of the root pump 2 in real time so as to ensure safe operation of the root pump 2. Preferably, the vibration sensor is installed at the bearing of the root pump 2.

The transferring tube 35 includes a metal soft tube B1 and is installed with a fifth isolation valve A1 which is located between the metal soft tube B1 and the train body 1. In FIG. 1, the fifth isolation valve A1 is a manual isolation valve. The metal soft tube B1 is capable of being removed or moved. A safe pressure releasing valve C1 is installed on the train body 1.

An outer side of the train body 1 is installed with at least one second pressure sensor 12 to monitor and transmit a positive and negative pressure within the train body 1.

A movable control unit 6 is connected to the at least one root pump 2 and other above components (such as above said first isolation valve 42, second isolation valve 44, third isolation valve 46, fourth isolation valve 48, proportional control valve 32, temperature sensor 34, first pressure sensor 36, silencer 5, fifth isolation valve A1, safe pressure releasing valve C1, second pressure sensor 12, etc.) The first tube 20, the second tube 25, the connective tube 30 and the at least one root pump 2 are movable structures. The movable control unit 6 is capable of being moved together with the first tube 20, the second tube 25, the connective tube 30 and the at least one root pump 2. The movable control unit 6 includes a plurality of control components such as at least one air circuit breaker, at least one relay, at least one PLC (programmable logic controller), at least one thermal protection unit and a control program for intelligent controlling of the at least one root pump 2 and other above components. The movable control unit 6 also includes a control box for housing above control components.

The thermal protection unit serves to stop the at least one root pump 2 for purpose of overload protection and preventing damage by means of contacting of an acting unit driven by bending of two metal sheets which are heated by overload current. The at least one relay serves to isolate a power circuit and a control circuit of the movable control unit 6 to provide isolation protection and reduce the risk of damage to the movable control unit 6. The at least one relay further serves to amplify control signal of the movable control unit 6 for controlling of strong power by weak power. The at least one air circuit breaker serves to protect the movable control unit 6 by means of automatically breaking as long as current of the movable control unit 6 exceeds a rated current, thus it provides easy repairing of the movable control unit 6. The at least one PLC serves to control the movable control unit 6 and plays a key role in the movable control unit 6, it is effective, safe, reliable, intelligent, more convenient, user friendly and has advantages of fast response, high real-time, comprehensive protection, easy maintenance. The at least one root pump 2 is controlled and monitored by the at least one PLC so as to be more intelligent and more visual, and data monitored from the at least one root pump 2 is recorded and is able to be queried.

In prior art, an air compressor is unable to produce a negative pressure and large gas flow. Therefore, the advantages of the present invention are that at least one root pump, a plurality of tubes and valves form a complete test system for alternating pressure fatigue test for a train body of a high-speed train by means of alternating the pressure of the train body between a positive and negative pressure. Soft and hard tubes and pressure sensors are connected to the train body for testing and monitoring of a movable control unit. The present invention is able to be completely unattended and is able to adjust the test pressure range and generate different test waveform curve according to various speed types of high-speed trains.

The present invention improves the hardware system and control system in the alternating pressure fatigue test system for a high-speed train. Therefore, the floor space, investment costs and power consumption of the fatigue test system are significantly reduced. The present invention is able to intelligently apply alternating pressure fatigue test to various high-speed trains with running speeds from 200 to 600 km per hour. The present invention is able to simulate the pressure changes inside and outside the high-speed train when the high-speed train is passing through a tunnel or crossing other high-speed train inside the tunnel more realistically so that actual working conditions can be reflected. The present invention ensures that the gas flow field inside the high-speed train is uniform and the pressure waveform is easy to control. The present invention has no temperature rising and is movable and easy to integrate, which has dual functions of fatigue test and pressure-holding test.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An alternating pressure fatigue test system for a high-speed train based on an internal root pump loading mechanism serving to apply an alternating pressure fatigue test to the high-speed train; the alternating pressure fatigue test system comprising:
   a train body (1) which is a train body of the high-speed train;
   a first tube (20) and a second tube (25); the first tube (20) having one end which forms a gas output opening (22); the second tube (25) having one end which forms a gas input opening (27); another end of the first tube (20) and another end of the second tube (25) being connected to each other to form a third joint (C);
   a connective tube (30) having one end connected to a first joint (A) located at a middle part of the first tube (20) and another end of the connective tube (30) being connected to a second joint (B) located at a middle part of the second tube (25); the first tube (20), the second tube (25) and the connective tube (30) serving to transfer gas; gases within the first tube (20), the second tube (25) and the connective tube (30) being communicated with each other;
   at least one root pump (2) installed on the connective tube (30) and serving to transfer gas within the connective tube (30) in a single fixed direction;
   a first isolation valve (42) installed in the first tube (20) and located between the gas output opening (22) and the first joint (A);
   a second isolation valve (44) installed in the second tube (25) and located between the gas input opening (27) and the second joint (B);
   a third isolation valve (46) installed in the first tube (20) and located between the first joint (A) and the third joint (C);
   a fourth isolation valve (48) installed in the second tube (25) and located between the second joint (B) and the third joint (C); and wherein gas flow and direction of the gas flow in the first tube (20), the second tube (25) and the connective tube (30) are controlled by opening and closing of the first isolation valve (42), second isolation valve (44), third isolation valve (46) and fourth isolation valve (48) to switch the a pressure within the train body (1) between a positive pressure and a negative pressure;
   at least one transferring tube (35) connected between the third joint (C) and the train body (1); gases within the first tube (20), the second tube (25) and the train body (1) being communicated with each other through the at least one transferring tube (35);
   wherein when external gas needs to be input into the train body (1) for testing, the second isolation valve (44) and the third isolation valve (46) are opened and the first isolation valve (42) and the fourth isolation valve (48) are closed; by pumping of the at least one root pump (2), external gas is input from the gas input opening (27) to the second joint (B) of the second tube (25) and flows through the connective tube (30) to the first joint (A) of the first tube (20) and flows to the third joint (C) and flows through the at least one transferring tube (35) into the train body (1) for testing; a gas input path is formed between the gas input opening (27) and the third joint (C);
   wherein when gas within the train body (1) needs to be output for testing, the first isolation valve (42) and the fourth isolation valve (48) are opened and the second isolation valve (44) and the third isolation valve (46) are closed; by pumping of the at least one root pump (2), gas within the train body (1) leaves from the at least one transferring tube (35) to the third joint (C) and flows to the second joint (B) of the second tube (25) and flows through the connective tube (30) to the first joint (A) of the first tube (20) and flows to the gas output opening (22) to be output from the gas output opening (22) for testing; a gas output path is formed between the third joint (C) and the gas output opening (22); and
   wherein the at least one root pump (2) serves as at least one root vacuum pump when the pressure within the train body (1) is lower than a standard atmosphere (1 atm); the at least one root pump (2) serves as at least one root blower when the pressure within the train body (1) is higher than or equal to the standard atmosphere.

2. The alternating pressure fatigue test system for the high-speed train based on the internal root pump loading mechanism as claimed in claim 1, wherein the at least one root pump (2) is controlled by variable frequency controlling.

3. The alternating pressure fatigue test system for the high-speed train based on the internal root pump loading mechanism as claimed in claim 1, further comprising at least one proportional control valve (32) installed in the connective tube (30) and located near the at least one root pump (2); the at least one proportional control valve (32) serving to control gas flow rate in the transferring tube (35).

4. The alternating pressure fatigue test system for the high-speed train based on the internal root pump loading mechanism as claimed in claim 1, further comprising at least one temperature sensor (34) installed in the connective tube (30) and located near the at least one root pump (2).

5. The alternating pressure fatigue test system for the high-speed train based on the internal root pump loading mechanism as claimed in claim 1, further comprising at least one pressure sensor (36) installed in the connective tube (30) and located near the at least one root pump (2); the at least one first pressure sensor (36) serving to monitor pressure load of the at least one root pump (2).

6. The alternating pressure fatigue test system for the high-speed train based on the internal root pump loading mechanism as claimed in claim 1, further comprising at least one silencer (5) installed on the connective tube (30) and located near the at least one root pump (2); the at least one silencer (5) serving to decrease noise.

7. The alternating pressure fatigue test system for the high-speed train based on the internal root pump loading mechanism as claimed in claim 1, wherein the root pump (2) has a vibration sensor installed at a bearing of the root pump (2) to monitor vibration of the bearing of the root pump (2) in real time.

8. The alternating pressure fatigue test system for the high-speed train based on the internal root pump loading mechanism as claimed in claim 1, wherein the root pump (2) is a pump serving to compress and convey gas by relative motion of two two-leaf-shaped rotors or two three-leaf-shaped rotors in a chamber room of the root pump (2).

9. The alternating pressure fatigue test system for the high-speed train based on the internal root pump loading mechanism as claimed in claim 1, wherein the transferring tube (35) includes a metal soft tube (B1) and is installed with a fifth isolation valve (A1) which is located between the metal soft tube (B1) and the train body (1); the metal soft tube (B1) is capable of being removed or moved; and a safe pressure releasing valve (C1) is installed on the train body (1).

10. The alternating pressure fatigue test system for the high-speed train based on the internal root pump loading mechanism as claimed in claim 1, wherein an outer side of the train body (1) is installed with at least one second pressure sensor (12) to monitor and transmit a positive and negative pressure within the train body (1).

11. The alternating pressure fatigue test system for the high-speed train based on the internal root pump loading mechanism as claimed in claim 1, wherein the alternating pressure fatigue test serves to simulate pneumatic load fatigue of train windows, train skirts, train parts and the train body of the high-speed train when the high-speed train is passing through a tunnel.

12. The alternating pressure fatigue test system for the high-speed train based on the internal root pump loading mechanism as claimed in claim 1, further comprising a movable control unit (6) connected to the at least one root pump (2), the first isolation valve (42), the second isolation valve (44), the third isolation valve (46), the fourth isolation valve (48); wherein the connective tube (30) and the at least one root pump (2) are movable structures and the movable control unit (6) is capable of being moved together with the first tube (20), the second tube (25), the connective tube (30) and the at least one root pump (2); wherein the movable control unit (6) includes at least one air circuit breaker, at least one relay, at least one PLC (programmable logic controller), at least one thermal protection unit and a control program for intelligent controlling of the at least one root pump (2); and wherein the movable control unit (6) further includes a control box.

\* \* \* \* \*